(12) United States Patent
Abraham et al.

(10) Patent No.: US 12,419,463 B2
(45) Date of Patent: Sep. 23, 2025

(54) SELF-CLEANING AUTOMATED BLENDED DRINK MACHINE

(71) Applicant: SMOODI, INC., Boston, MA (US)

(72) Inventors: Morgan Abraham, Boston, MA (US); Pascal Kriesche, Boston, MA (US)

(73) Assignee: Smoodi, Inc., Boston, MA (US)

( * ) Notice: Subject to any disclaimer, the term of this patent is extended or adjusted under 35 U.S.C. 154(b) by 0 days.

(21) Appl. No.: 17/195,080

(22) Filed: Mar. 8, 2021

(65) Prior Publication Data
US 2021/0274974 A1    Sep. 9, 2021

Related U.S. Application Data

(60) Provisional application No. 62/986,432, filed on Mar. 6, 2020.

(51) Int. Cl.
| | |
|---|---|
| A47J 43/044 | (2006.01) |
| A23L 19/00 | (2016.01) |
| A47J 43/07 | (2006.01) |
| A47J 43/08 | (2006.01) |

(52) U.S. Cl.
CPC ............. *A47J 43/044* (2013.01); *A23L 19/09* (2016.08); *A47J 43/0755* (2013.01); *A47J 43/082* (2013.01); *A23V 2002/00* (2013.01); *A47J 2043/04472* (2013.01)

(58) Field of Classification Search
CPC .......................................... A47J 2043/04472
USPC .................... 366/138, 168.1, 172.2, 206, 207
See application file for complete search history.

(56) References Cited

U.S. PATENT DOCUMENTS

| | | | | |
|---|---|---|---|---|
| 1,496,611 | A * | 6/1924 | Siegel | A47J 43/044 366/207 |
| 1,569,049 | A * | 1/1926 | Stufflebeam | A47J 43/044 416/129 |
| 2,016,554 | A * | 10/1935 | Nichols | A47J 27/004 310/91 |
| 5,067,819 | A * | 11/1991 | Heinhold | B01F 27/805 134/104.1 |
| 11,419,458 | B2 * | 8/2022 | Gardner | A47J 43/044 |
| 2002/0194999 | A1 * | 12/2002 | Ervin | A23G 9/045 99/275 |
| 2011/0090756 | A1 * | 4/2011 | Farrell | B01F 27/80 366/138 |
| 2013/0279288 | A1 * | 10/2013 | Dong | A23G 9/44 366/192 |
| 2014/0147564 | A1 | 5/2014 | Nevarez et al. | |
| 2016/0016133 | A1 * | 1/2016 | Merritt | B01F 27/806 366/242 |
| 2016/0220069 | A1 * | 8/2016 | Gardner | A47J 43/044 |
| 2016/0317988 | A1 | 11/2016 | Pryor, Jr. et al. | |

(Continued)

OTHER PUBLICATIONS

Extended European Search Report in EP21763757.8, mailed Feb. 13, 2024, 32 pages.

*Primary Examiner* — David L Sorkin
(74) *Attorney, Agent, or Firm* — Lewis Rice LLC

(57) ABSTRACT

A stand-alone automated machine for the automatic blending of drinks. The machine will generally puree materials including fresh or frozen fruits and vegetables provided in large particulate sections or chunks within a cup which is available from a neighboring refrigerator or freezer unit. The blending machine can handle all aspects of drink blending as well as automatic cleaning, sanitization, and/or sterilization cycles.

12 Claims, 14 Drawing Sheets

(56) References Cited

U.S. PATENT DOCUMENTS

2019/0166872 A1  6/2019  Mathijssen et al.
2019/0261646 A1  8/2019  Herbert et al.

* cited by examiner

SELF-CLEANING AUTOMATED BLENDED DRINK MACHINE

CROSS REFERENCE TO RELATED APPLICATION(S)

This application claims the benefit of U.S. Provisional Patent Application Ser. No. 62/986,432, filed Mar. 6, 2020, the entire disclosure of which is herein incorporated by reference.

BACKGROUND OF THE INVENTION

1. Field of the Invention

The present disclosure relates to automated self-cleaning blenders and methods of operation of such machines. Specifically, it relates to blending machines useful for self-service vending and blending of fruit and vegetable smoothies and related products.

2. Description of the Related Art

Many consumers today desire nutritious food options. However, the rigors of modern life make convenience an important factor in dietary decisions as well. Most people simply do not have the time to shop for and prepare healthy meals and snacks and must instead resort to fast and convenient food options. Such options can include bottled sodas and prepackaged snack foods containing substantial chemicals and preservatives because they are shelf stable and easy to obtain. Unfortunately, those foods chosen for convenience do not generally provide as sufficient nutritional value as fresh options, as they often lack fruits, vegetables, and other components of a balanced diet. Fast food and unhealthy snack foods are believed to have contributed to an obesity epidemic in the United States and growing concerns with weight in many other countries. The United States, however, is often seen as a major contributor to world obesity through its "western diet" which often is lacking in fruits and vegetables, high in fat and refined carbohydrates, and often considered to be one of the most unhealthy in existence.

A major component of an unhealthy diet is not just what is eaten but also what is drunk. Sugary sodas and related beverages often contain large quantities of refined sugars and provide large numbers of "empty" calories with relatively little redeeming nutritional value. However, such prepared sodas are incredibly convenient as they are usually prepackaged or easily dispensed from a user operated soda machine. Further, many individuals, and particularly Americans, just do not desire water as a beverage as much as they should and sodas' flavor profiles can make them far more interesting to consume than calorie free beverages such as water, tea, or coffee.

While the drinking of fruit juices is also often cited as another problematic source of empty calories, one example of a healthy drink option is a fruit and/or vegetable smoothie. As opposed to juice which compresses the liquid from a fruit or vegetable and discards the solids, a smoothie is a blended beverage generally made from whole fruit and vegetables which are ground or blended (pureed) into a fairly thick viscous liquid. Smoothies typically include fruit or vegetable ingredients (including those that cannot be juiced) but, because they use the solids as well as the juice, most comprise not just fruit ingredients (unless the fruits have high water content such as oranges) but also include liquid ingredients such as milk, water, or juice to provide for liquidity. Smoothies may also include crushed ice, yogurt, peanut butter, soy, whey powder, and other supplemental ingredients to provide for specific nutritional profiles as well as specific body. In many cases, smoothies are not so much a beverage as a potentially complete meal in an easy to carry and consume form. As such, they can be readily adapted to a busy on-the-go lifestyle.

Smoothies provide a way to consume large amounts of natural whole food ingredients, and, because they typically involve grinding or blending (pureeing) of whole fruits and vegetables instead of just juicing them, are often a good source of dietary fiber and other vital nutrients for a balanced diet. Another attractive attribute of smoothies is that they can be tailored to the particular needs and tastes of the individual consuming them and are usually more filing than juices. Nutritional supplements (such as vitamins, minerals, medicinal plants, and the like) can also be added as desired making a smoothie a healthy meal by itself.

Although smoothies are often a healthy food option and are easy to carry and consume once made, they are not always convenient to make. Making a smoothie is difficult because it requires specialized equipment in the form of a powerful blender or grinder that can puree the desired fruits and vegetables from relatively large chunks which may be frozen. Further, smoothies generally require the user to have immediate access to many perishable ingredients. Significant amounts of perishable food are wasted by consumers who buy produce and cannot use it before it spoils.

Additionally, cutting fruits and vegetables into manageable particulate chunks to get them into the blender to prepare the smoothie is time consuming and messy. If frozen fruit is used, it can be industrially cut and frozen to simplify this step, but it then takes up substantial space in a home freezer. Finally, cleaning up after smoothie making can also be a challenge as it requires cleaning the blender (which often requires disassembly and can include difficult to clean parts), chopping implements, cutting surfaces, serving vessels, and anything else used in the process. If the cleanup is also not performed promptly, fruit and vegetable matter can dry and harden on surfaces making it very difficult to remove.

Unlike many other foods, these shortcomings cannot be solved simply by preparing large batches of smoothies ahead of time. Most smoothies provide desired texture by including an at least partially frozen blend of ingredients. If made in advance, the smoothie loses its consistency over time due to melting. Also, smoothies are optimally consumed when freshly made, or else certain nutrients will deplete and the smoothie may develop off-flavors.

Because of these problems, individuals who enjoy smoothies often either are forced to consume them on a regular basis with relatively consistent ingredients so as to be able to overcome the perishable material storage issue in their home, or they rely on a smoothie shop to obtain their smoothies. Smoothie shops avoid many of the problems with smoothie making at home because they can harness demand from many consumers to sell large amounts of perishable materials each day. Because of this they can also offer larger selections of ingredients and the ability to process the ingredients (such as cutting them down to size) utilizing captive labor or even industrial machinery at a much reduced cost.

While smoothie shops can provide a good option for those interested in occasional, or even regular, smoothie consumption, they involve a lot of cost and overhead to construct and operate. Opening a smoothie shop typically requires purchasing or leasing a large storefront, often in a high traffic or highly accessible (and, thus, expensive) area, purchasing the necessary equipment, and many additional upfront costs. A typical smoothie store can require $100,000-$750,000 in upfront working capital in order to open a new location. In addition, there are significant ongoing costs of paying for labor and management of inventory and risk of ingredients spoiling. Lastly, there is a space requirement as smoothie stores encompass a significant amount of square footage and require a large amount of storage space for perishable ingredients which also consumes large amounts of electricity. This high capital cost is then coupled with a product with a relatively low profit margin due to expense of ingredients and need for large amounts of labor in its assembly.

One option would be to provide smoothies via a vending machine. Generally speaking, traditional vending machines provide an automated platform for selling goods eliminating labor costs and allowing them to be provided within other structures and avoiding the need for an expensive storefront and space. Often vended goods have low unit sale prices, making them unattractive for conventional merchandizing. However, traditional vending machines dispense prepackaged (i.e., not freshly-made) goods and require products with long shelf lives meaning they typically include large amounts of preservatives. Less common are vending machines that can dispense fresh meals or foods. See, e.g., U.S. Pat. No. 7,303,093, the entire disclosure of which is herein incorporated by reference.

Another alternative is to prepare smoothie-like drinks from previously pureed fruits and vegetables which are stored in airless containers or frozen. These purees can then be reprocessed with small amounts of liquid and/or ice to get a smoothie-like drink. While this is a good option for other viscous drink products like milkshakes where there are few options of ingredients, this method of manufacturing is often unacceptable for smoothies. In the first instance, the existing puree typically has to be overly thin and smooth and of consistent texture to be useable in later processing such as by processing it with ice to give it the desired resultant viscosity. Further, the processed purees often lack good texture from the fruit as the storage process can damage their inherent characteristics. Further, pre-preparation of purees can defeat the ability to provide options in the fruits, vegetables, and supplements included in the smoothie to the end user as the purees have to be pre-prepared and generally cannot be altered or mixed by the user. Further, in order to make the puree shelf stable or even freezer stable, the puree may need preservatives or other undesirable ingredients added.

SUMMARY

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, there is a need for an automated drink blending machine that can form blended drinks, such as smoothies, from disparate source ingredients by pureeing them on demand. There is described herein, among other things, a machine that comprises a self-serve standalone automatic drink blending unit that can sit on a counter that does not require an operator. It is generally able to blend fresh customized smoothies or similar drinks using frozen and/or fresh ingredients which are typically sold from a neighboring refrigerator or freezer unit in a particulate or granulate (typically with relatively big pieces) form. Specifically, underlying source fruits and vegetables are in an unpureed form prior to be provided to the drink blending machine. The blending machine can handle all aspects of blending, and can automatically puree a variety of different fruits and vegetables. It can also provide automatic cleaning, sanitization, and/or sterilization cycles to enhance user safety.

There is described herein, among other things, a machine for automated drink blending, the machine comprising: a cup support configured to hold a cup; a blender assembly including: a blender shaft including blender blades attached thereto and a motor for rotating the blender shaft; a cup hat, the cup hat being sized and shaped to engage and hold a top of the cup while the blender shaft descends through the cup hat to place the blender blades into an internal volume of the cup; and a valve for supplying liquid to the internal volume of the cup through the cup hat;

and a lifting mechanism for raising and lowering the blender assembly relative to the cup support; wherein the motor rotates the blender shaft while the blender blades are within the internal volume of the cup.

In an embodiment, the machine further comprises a safety door which can alternatively allow and deny access to the cup support.

In an embodiment of the machine, the cup hat engages a lip of the cup.

In an embodiment of the machine, the cup hat engages the lip from inside the internal volume.

In an embodiment of the machine, the cup includes a lid.

In an embodiment of the machine, the cup hat engages the lid and the blender blades descend through the lid.

In an embodiment of the machine, the cup hat engages the lid from outside the internal volume.

In an embodiment of the machine, the internal volume of the cup includes chunks of material and the motor rotating causes the blender blades to puree the chunks within the internal volume of the cup.

In an embodiment of the machine, the chunks comprise fruits.

In an embodiment of the machine, the chunks comprise vegetables.

In an embodiment of the machine, the liquid is supplied to the internal volume of the cup before the motor rotating is initiated.

In an embodiment of the machine, the liquid is supplied to the internal volume of the cup before the cup hat engages the cup.

In an embodiment of the machine, the liquid is supplied to the internal volume of the cup as the motor is rotating.

In an embodiment, the machine further comprises a coil spring biasing the cup hat to engage the cup.

In an embodiment of the machine, the cup support includes a basin configured to have the cup placed therein.

In an embodiment of the machine, the cup hat is configured to engage the basin.

In an embodiment of the machine, when the cup hat is engaged to the basin, liquid is supplied to the basin to clean the blender blades.

In an embodiment of the machine, the liquid is supplied to the basin by the valve.

In an embodiment of the machine, the cup hat includes an air release.

In an embodiment, the machine further comprises a computer controller for automatically raising and lowering the positioning head, activating the motor and rotating the blender shaft; and supplying liquid to the internal volume.

In an embodiment of the machine, the computer controller can alter at least one of: a position of the blender blades relative to the cup or a speed of the motor, in response to sensor feedback indicative of resistance encountered by the blender shaft.

In an embodiment of the machine, the resistance encountered by the blender shaft is on rotation of the blender shaft.

In an embodiment of the machine, the resistance encountered by the blender shaft is on the blender shaft's movement relative to the cup.

There is also described herein, in an embodiment, a method for automated drink blending, the method comprising: providing a cup; providing a blender assembly including: a blender shaft including blender blades attached thereto and a motor for rotating the blender shaft; and a cup hat, the cup hat being sized and shaped to engage and hold a top of the cup; placing the cup in a cup support; lowering the blender assembly to place the cup hat in proximity to the cup, but not in contact with the cup; supplying liquid to the internal volume of the cup; further lowering the blender assembly so the cup hat engages the cup and the blender shaft descends through the cup hat to place the blender blades into an internal volume of the cup; and the motor rotating the blender shaft while the blender blades are within the internal volume of the cup.

BRIEF DESCRIPTION OF THE DRAWINGS

FIG. 2A depicts a detail view of a self-cleaning blending machine with the door open and a cup of fruit inserted.

FIG. 2B depicts a detail view of a self-cleaning blending machine with the door closed and a cup of fruit inserted.

FIG. 2C depicts a detail view of a self-cleaning blending machine with the door closed and the cup support engaged with the cup.

FIG. 2D depicts a detail view of a self-cleaning blending machine with the door closed and the blender head in the blending position.

FIG. 2E depicts a detail view of a self-cleaning blending machine with the door closed and the blender in a cleaning position.

FIG. 3B depicts the embodiment of FIG. 3A in a cut-through.

DETAILED DESCRIPTION OF THE PREFERRED EMBODIMENT(S)

Figure 1:
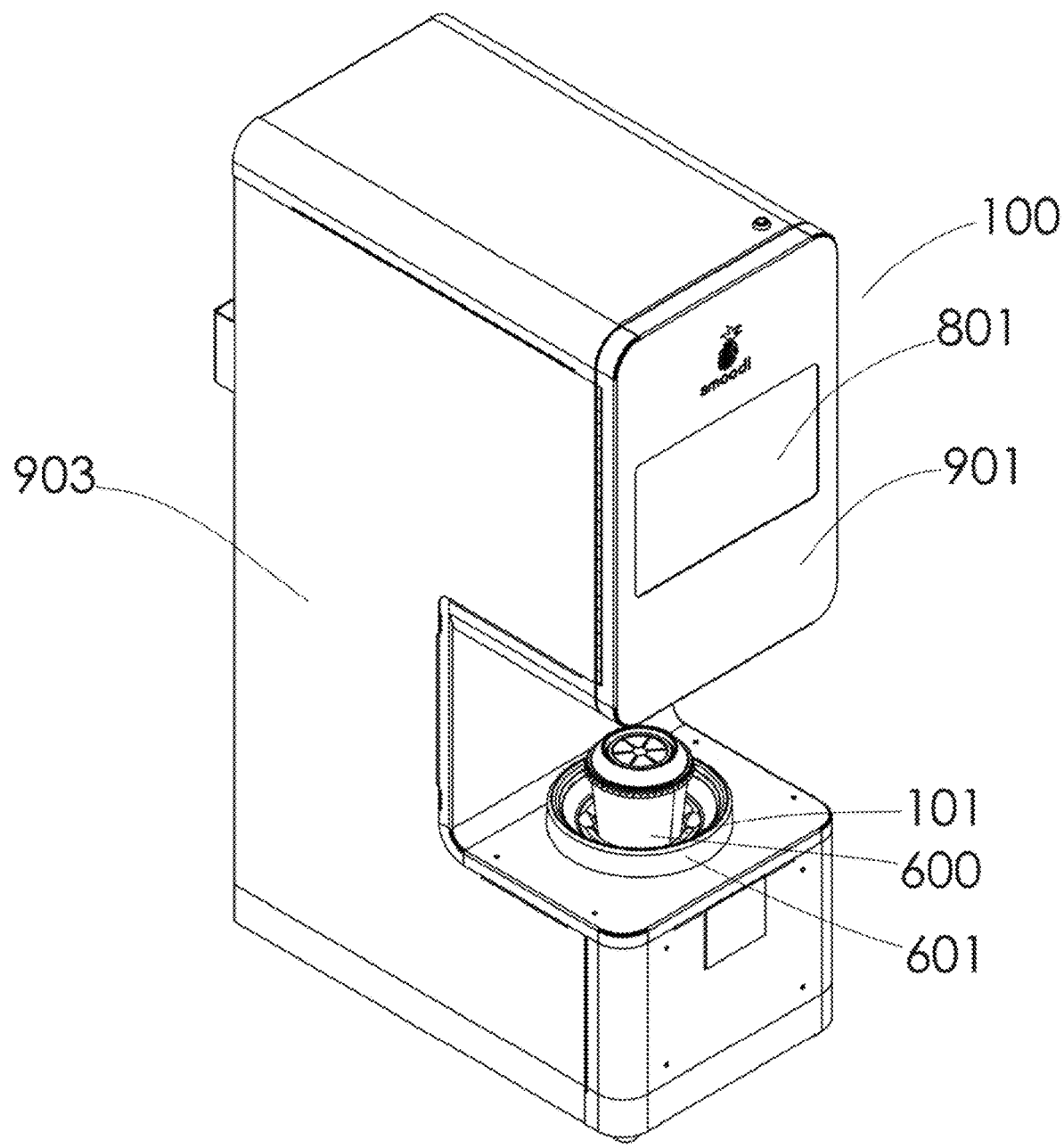
FIG. 1 depicts a perspective view of an embodiment of an automated self-cleaning blending machine.

Described herein are embodiments of automated self-cleaning blending machines (100) and methods of their operation. The machine (100) discussed primarily herein is generally designed to blend "smoothie" type drinks through the pureeing of fresh or frozen fruit or vegetables provided whole or in large chunks. However, it may also be used to blend other materials provided in a "chunk-type" form. For example, pre-cut fruits or vegetables may be blended or pureed to form blended or creamed soups or hot drinks. The machine (100) is generally not intended to be used to reprocess pre-pureed fruit, fruit syrups, or fruit juice with a non-fruit "chunk" product such as ice. However, the machine (100) would be capable of doing such in the same way a traditional blender can puree fruit or, in fact, blend anything, as reprocessing pre-processed materials is typically a simpler operation than processing them in the first place.

While the machine (100) is designed to be operated primarily on fruits and vegetables to puree them, the resultant drink may also include various other materials. These can include, but are not limited to: dairy products such as, but not limited to, milk or yogurt; ice; nut milks or water-based plant extracts; coconut water; fruit juices, honey, molasses, and algae. Various nutritional supplements such as, but not limited to, vitamins, minerals or medicinal plants or plant extracts, concentrates, or oils that will commonly be provided as liquids or fine powders may also be included. Nutritional supplements or certain flavorings may also be supplied as fruit or vegetable purees (e.g. acai or lilikoi) which may be frozen. Gelling agents may also be included in certain cases.

The contents of any particular smoothie drink, or other product to be processed by the machine (100) are not particularly relevant to the current disclosure other than that there will typically be multiple drink options available which comprise different combinations of fruit, vegetable, dairy, ice, supplements, and other ingredients many of which (and typically a majority by volume) will be provided in a non-uniform and generally quite large particulate or granulated form (called "chunks"). The machine (100) is, thus, capable on acting on any and all such items and not a particular selected subset. The fruits and vegetables, in particular, will require grinding, blending, or otherwise pureeing together (typically with another liquid) to form a viscous fluid which is the smoothie drink. In alternative embodiments, alternative beverage or food materials may be provided including frozen dairy (such as, but not limited to, ice cream and frozen yogurt), alcoholic beverages, or forming agents such as thickeners to make different types of drinks which are formed in similar fashion to smoothies, but are not technically considered "smoothies".

The contents of the smoothie drink which will be provided to the machine (100) will typically be provided via a separate cup (600) which will include the chunks of various fruits and vegetables and may include liquids or semi liquid ingredients as well. They may also include powdered materials to be blended in. It is not particularly important for this disclosure how the materials may be placed in the cup, only that when the smoothie drink is to be blended, the cup includes the materials to be blended in a non-previously pureed or heavily processed form. They are typically provided simply as cut-up into large chunks and typically with at least some of those chunks being individually frozen. The contents of the cup (600) prior to placing in the machine (100) will also typically not include sufficient liquid to result in easy generation of a viscous fluid puree during blending, but that is by no means required.

Throughout this disclosure, the term "computer" describes hardware that generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including, but not limited to eyewear, wrist wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, may refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices that are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

For purposes of this disclosure, there will also be significant discussion of a special type of computer referred to as a "mobile communication device". A mobile communication device may be, but is not limited to, a smart phone, tablet PC, e-reader, satellite navigation system ("SatNav"), fitness device (e.g., a Fitbit™) or any other type of mobile computer whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a traveler's person, and usually is in constant communication with a network.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software may be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications or similar network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network. Servers and clients may also exist virtually in so-called "cloud" arrangements.

FIG. 1 provides an embodiment of an automated self-cleaning blending machine (100). The blending machine (100) will typically include an outer housing (901) which encloses the functional elements of the machine (100). The housing (901) will typically include on its outside a cup support (101) which will usually be in the form of a recessed basin (601) sized and shaped to accommodate the lower portion of a cup (600) of the type it is to be used with. However, the cup support (101) may be of any shape or size to accommodate and hold at least a portion of a cup (600) within which the drink is to be made.

The housing (901) may also include a display (801) for operation of the machine (100) and for selection of particular cycles of blending and other forms of user interaction and feedback. These variables and choices can relate, for example, to a chosen resultant viscosity of the drink or smoothie, selected time for blending, specifically selected add-in materials which are provided as part of the machine (100), or other controllable variables of blending. They may also provide options such as if water or other liquids are to be used to assist in the blending. Other forms of feedback may also be solicited or provided as would be understood by one of ordinary skill in the art.

The display (801) will typically allow input from users to select their options and provide instructions on how to properly use the machine and interact with the machine. This may be achieved through a combination of buttons, lights with written/visual prompts, touchscreen interfaces, and/or interaction through an external mobile application such as, but not limited to, a mobile device software application (an "app" in common terminology) that the user brings with them. The display (801) will typically provide inputs from itself to a computer controller within the machine (100) which will utilize software in associated memory in order to control the functionality of the machine (100) and operate its parts. However, in an embodiment, the computer and software may be replaced by dedicated circuitry performing the same functions. The computer controller may also obtain additional information from a network or provide information to a network about the operation of the machine (100), to request maintenance, or to report information related to its recent use. Operation of the machine (100) via the non-human and typically computer controller is what makes the machine "automatic."

Frontend software of the machine (100) will typically provide imagery on the display (801) and will typically serve to provide instructions, warnings, and feedback for users operating the machine (100). Generally, the frontend software, in an embodiment, is designed to make it clear and simple for a first time user to properly use the machine (100) and receive a well-blended drink. It also can make the experience enjoyable for users in order to encourage them to return and to provide for entering content to draw a user to the machine (100) for the first time. The frontend software, in the depicted embodiment of FIG. 1 where the display (801) comprises an interactive touchscreen, will typically provide screen instructions on the display (801) of all steps requiring an action from the user and also provide error messages if the user makes a mistake or the machine (100) malfunctions. The software may also provide the user insight on the current status of the machine and its progress as it makes the target drink.

The machine (100), as visible externally, will also typically include a safety door (103) which is designed to alternatively allow and deny access to the cup support area (101). Access to the area (101) allows placement of the cup (600) by the user into the machine (100) in order to carry out the blending operation. Inhibition of access will typically be used when such loading is not required or desired to limit the risk of any tampering with the machine (100), to inhibit injury during the machine's (100) blending and cleaning cycles, and to assist in keeping any potential food contact areas of the machine (100) clean and sanitary between uses.

The safety door (103) and housing (901) combination will typically encloses the entire blender assembly (700) during the time that blending or cleaning is engaged. The blender assembly (700) will generally reside within the upper part (903) of the housing (901) when not actively performing blending or cleaning operations to inhibit users from touching it when the safety door (103) is open.

Once the door (103) is closed, it may be locked, in an embodiment, by a lock that is normally in a locked position. For example, an electronic lock that is locked when de-energized. In such an embodiment, the door (103) remains locked even in the loss of power to the machine (100). The door (103), in an embodiment, may also activate a sensor or switch (not shown) when in an open or closed state that sends a signal to the controller of the machine (100) to indicate the state. For example, this can provide a safety lock where the door (103) must be closed before the controller is allowed to turn on the blender assembly (700). Alternatively, the door (103) may be driven by a non-backdrivable motor so the door cannot be raised unless it is raised under power. Thus, in the event of power failure, the door (103) cannot be pushed open.

To respond to a case of critical system failure or the risk of incorrect or malicious software being loaded into the memory or computer controller, an additional safety feature may be added to the system in an embodiment. In this arrangement, the door (103) closed switch or sensor includes a second output that is hardwired to the blender assembly's (700) incoming power source and/or signal path. Should the safety door (103) not be fully shut, the blender assembly (700) will be unable to receive power or instruction to activate even if the computer controller turns it to the "On" position. Typically, this will prevent the lift motor (8071) from moving the carriage (8031) or the blender motor (733) from rotating the blender shaft (731). Typically, the door (103) will be removable for cleaning, service, or replacement. Thus, another safety switch may be installed on the door mount, to ensure the machine (100) will only operate when the door (103) is properly present and attached.

As the open and closing of the door (103) may be automated and controlled by the controller in conjunction with instructions on or from the display (801), a further sensor may be included within the cup support area (101) or any other relevant location to detect whether any foreign objects (such as, a user's hand) are not clear of the door (103) before opening or closing the door (103) to prevent injury to a user or damage to the machine (100). Further, position feedback and/or current sensors may be used to limit the speed of the door (103) at the bottom of the travel or to reverse the door closing action should resistance above a threshold be detected. This can further prevent pinching or injury before closing as well as detecting and reversing door (103) closing should there be an object blocking the door (103).

As best depicted in FIG. 1, the door (103) is preferably transparent or translucent to allow a user to view the blending process. This is not required, but transparency of the door (103) allows a user to verify that additional unexpected product is not added to their drink during blending. It also allows the user to view the process providing them something to do while waiting from the process to complete. To further enhance the viewing process, the cup (600) may also be transparent or translucent, stationary, and visible throughout the entire process. Thus, in an embodiment, the cup (600) remains stationary and all movement is of the machine's (100) components. The blender assembly (700) is lowered to the cup (600), the blender shaft (731) is lowered into the cup, and all liquid dispensing comes from nozzles (303) above the cup (600) while the cup (600) is held stationary.

Figure 6:
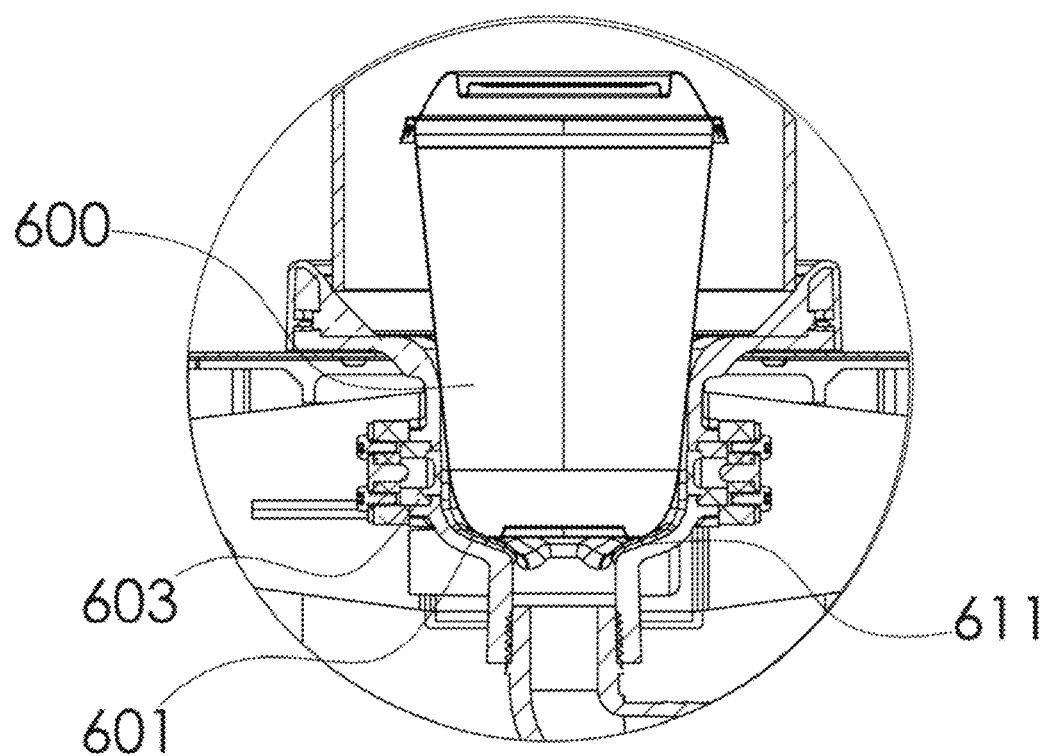
FIG. 6 depicts the base of a cleaning basin showing a cup sensor.

Another element of the present machine (100) is to detect when and if a cup (600) is present in the cup support area (101) to make sure the blending action actually takes place in a cup (600) as intended. The machine (100) will generally need to detect the presence of a cup (600) to insure that blending and cleaning cycles are performed properly. In the depicted embodiment of FIG. 6, the lower portion of the basin (601) is shown with a cup (600) therein. There is provided at the edge of basin (601) toward the base (611) a sensor (603). The sensor (603) typically needs to be both durable and accurate given that cups (600) will be repeatedly placed into and out of the basin, cups (600) will be sitting in the basin (601) when their contents are being blended which exposes them to potentially violent movement, and the sensor (603) will often be splashed by or submerged in liquids such as during the cleaning process.

In various embodiments, the sensor (603) may comprise a mechanical sensor and/or load cell or weight sensor. In the depicted embodiment of FIG. 6, the sensor (603) comprises an optical sensor. In an alternative embodiment, the optical sensor (603) may also include the functionality of a barcode scanner/RFID reader to gather additional information about the specific cup (600) being inserted. Such functionality may also or alternatively be provided elsewhere in the housing (901). This can be used to gather information about the expected contents of the cup (600) and to inhibit the use of the blending machine (100) to blend materials in an unexpected or reused cup (600) which can result in damage to the machine (100).

The sensor (603) will typically be used to sense both the presence and absence of a cup (600) at different times during machine (100) operation. For example, the sensor (603) will typically be used to sense the presence of a cup (600) after the door (103) has been opened for the cup (600) to be loaded. In this way the controller will be able to continue with the blending process in the expected manner with a cup (600) present. Similarly, at the end of the blending, the sensor (603) will typically be used to indicate that the cup (600) has been removed and the user has departed with their drink so the cleaning cycle may begin. Some users may become distracted during the blending process and could forget to grab their drink. If the cup (600) is still sensed at the end of the blending process after the door (103) has been open for a period of time, the computer controller can provide an indicator or reminder to remove the drink. This also makes sure that the machine (100) is cleared for the next user.

Another place where the sensor (603) can be valuable is when it is time to run any cleaning, sanitization, or sterilization processes. The cup sensor (603) allows the machine (100) to know its safe to begin the cleaning or other process. In an embodiment, the door (103) may be open between blending cycles so the cleaning process would typically need the first action to be closing the door (103). Should a cup with smoothie be present during this process (or there be any foreign object in the cup area (101)) running the cleaning process can create a mess and potential damage to the system.

Another area where sensors are useful around the cup (600) are detecting if the cup (600) is ready for blending. As discussed later, the machine (100) utilizes a plunge blender which blends in the cup (600) after the blender assembly (700) descends to the cup (600). Thus, the interior volume of the cup (600) must be accessible from above. Depending on the source and design of the cup (600), the cup (600) may have a lid which needs to be removed prior to being placed in the machine (100) or may have a seal, a portion of a lid, or other structure inhibiting access to the interior volume of the cup (600) which needs to be removed prior to the cup (600) being placed in the machine (100). In an embodiment, the machine (100) includes a sensor able to detect the presence of the lid, lid seal, or other encumbrance on the top of the cup (600) which needs to be removed prior to adding liquid and blending. Should a user not remove a lid, lid seal, or other object on the top of the cup (600) before inserting it in the machine (100), the activation of a blending process will likely destroy the cup (600), create a significant mess of broken plastic and pureed ingredients as the blender attempts to blend at least a portion of the lid, cause rupturing of the cup (600), and/or damage to the machine (100).

Depending on embodiment, an optical sensor, camera or a mechanical pressure sensor may be used to detect the presence of a lid or lid seal which was supposed to be removed. In an embodiment, the machine (100) will gently lower the blender shaft (731) and blades (775) which will press against a lid or other object which is not supposed to be present. In this arrangement, a measure of the strain or change in position of the blender shaft (731) may be used to determine that a lid or other undesired object is present before starting the blending sequence.

It should be recognized that an automated blending machine has much less functionality if it is only capable of blending a single type of raw material. In this case, the machine (100) is not really blending by simply stirring or reprocessing a previously pureed material with a thickener or body former such as ice. Blending in the form of pureeing of fruit and vegetables typically requires that disparate ingredients in the source be pulverized into small particles which are formed together or suspended in liquid to make a viscous fluid. Thus, in an embodiment, the machine (100) should be able to reliably and consistently blend an assortment of ingredients that vary in size, shape and hardness (including, frozen, fresh and freeze-dried fruits and vegetables of many types). The machine must be able to quickly puree and blend these nonhomogeneous ingredients to a generally homogenous fluid mixture typically within a specified range of viscosity and to do so quickly and consistently.

The complicated nature of blending is enhanced as the number of available ingredients and ingredient types goes up. For example, different frozen fruits, even if they are cut to a relatively uniform size, may have wildly different blend characteristics. For example, frozen orange wedges often behave more like ice (water) cubes while frozen bananas (which have very low water content) do not. Similarly, fresh fruits have different blend characteristics compared to the same fruit frozen. Also, many smoothie drinks utilize add-in or "boosters" which may be provided as powders (for example, mineral supplements), as thick gels or pastes (for example, honey or peanut butter), as thin fluids (for example, wheatgrass juice), or in other forms.

Use or inclusion of such add-ins will often be voluntary by the user and they may or may not be present in combination with any selected fruit and vegetable combination. The machine (100) ideally needs to be able to determine the viscosity of the drink being blended to ensure that a correct fluid level is added based on the inclusion of such disparate underlying ingredients. Further, it may need to do so without an accurate indicator of what the ingredients are.

Typically, fluid in the form of water (although other fluids such as milk, nut milk, or fruit juice may be used in alternative embodiments) will be added to the cup (600) by the machine (100) to provide for a drink with target viscosity as the cup (600) will often contain little if any fluid at the point the blending operation commences. This arrangement allows the machine (100) to have increased control over viscosity as the cup (600) will typically include a very high level of solids which, typically, cannot be fully liquefied by a blending process alone without the addition of some liquid. Generation of fruit pastes has its uses, but is typically not useful for drinks. The machine (100), thus, generally needs to select a proper liquid addition ratio to provide both target viscosity and consistency of texture and create a viscous fluid as opposed to a paste. Furthermore, the machine (100) needs to handle wide variations of ingredients without overflowing the cup (600) and spilling during blend sequence as this would both create an unappealing mess and waste product.

In an embodiment, accurate blending (pureeing) is resolved through a combination of machine hardware and operational software that allows an embodiment of the machine (100) to alter its blending sequence depending on the smoothie ingredients it blends. To determine ingredients, and their current state, the machine (100) may initially provide the ability to get an initial input of what is in the cup (600). This may occur as contemplated above via an optical scanning technology reading a code on the cup (600) which indicates its major ingredients. Alternatively, the user may be prompted to provide an indication of the contents of the cup (600) on the display (801).

With or without this initial input, the machine (100) may include sensors to determine several variables of the drink mixture before and/or during the blending sequence. These variables can include, but are not limited to, the pressure of the material in the cup (600) against the blender blades (775) or shaft (731) (either as it is turning or during descent), noise generated by the mixture during the blend sequence (which will typically decrease as particles are broken down), electrical current drawn by the blender motor (733) and/or the motor (8071) of the mechanical drive system, and/or visual movement of the drink itself. Monitoring of the blending sequence can serve to provide more consistent product, but can also inhibit risks of the blending motor (733) stalling and damaging or destroying itself in the event the blender shaft (731) binds.

The machine (100) controller may modify the blender blade (775) speed (rotational speed of the blender shaft (731)), the position of the terminal end (773) of the blender shaft (731), or the position of the blade (775) on the shaft (731) as changes in the viscosity and uniformity of the blended material are detected The result of this sequence allows the machine (100) to fully blend any expected mixture in a relatively minimal amount of time with a significant degree of certainty. It also makes it easy for the machine (100) to be used with different sized cuts of ingredients at varying levels of temperature, fiber content, and liquid content as this is an inherent problem with naturally formed raw materials that have not been previously heavily processed.

Figure 2A:
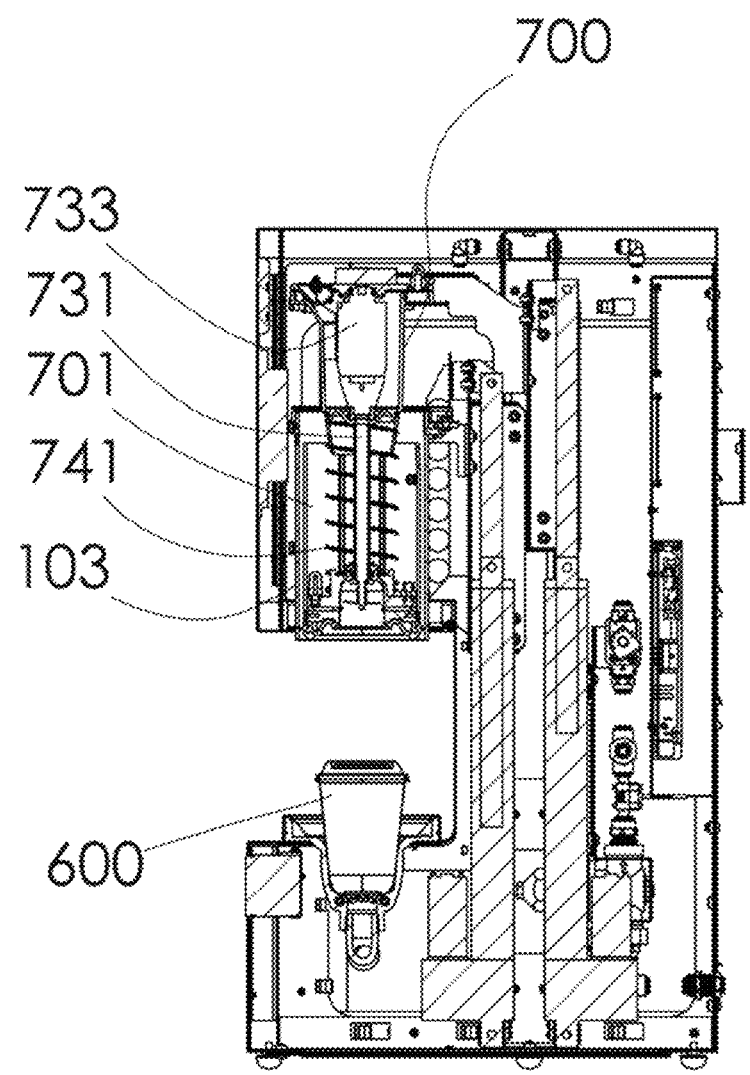
FIGS. 2A-2E depict various positions of the positioning head during different parts of the machine of FIG. 1's operation.
Figure 2B:
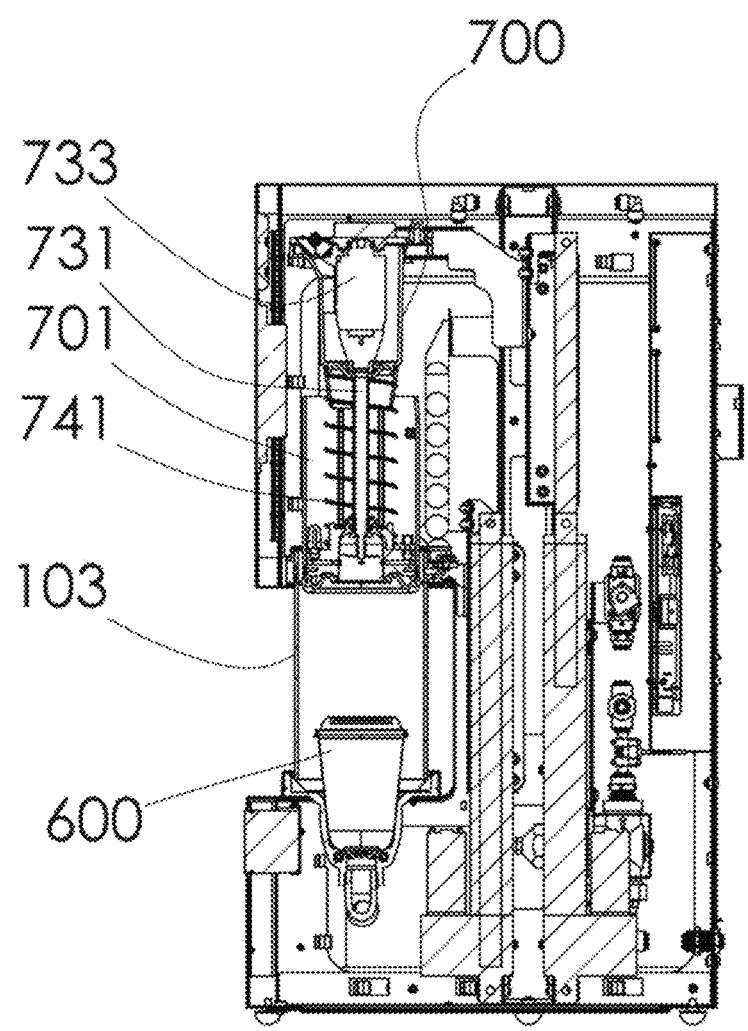

In an embodiment of the blending sequence, the machine (100) modulates the force the blender blades (775) exert on the contents of the cup (600) and the computer controller includes software which utilizes sensor information to detect the position of the blender blades (775) as well as the force exerted against the blender blades (775) by the contents of the cup (600). This can be used to initially reduce strain on the ingredients which will typically be in their largest "chunk" form at the start of blending to best break them apart into smaller pieces. As the ingredients begin to be broken or cut apart by the blades (775), sensors will typically detect the change in force and can alter the speed of position of the blades (775) to both initially break up ingredients which may not have fed into the blades (775) yet and to further reduce ingredients that are already partially chopped or broken up to still smaller size. Once ingredients have effectively been pureed to a sufficient level, the controller can alter the blades (775) position and/or speed to effectively stir the ingredients and blend the drink into a generally uniformly distributed mixture. To determine when ingredients have been broken down sufficiently, the computer controller may evaluate if the force exerted by the ingredients on the blades (775) is at an expected minimum (e.g. there is little to no resistance on the blades (775)) and/or when the blades (775) are able to travel to their lowest position (e.g. at the bottom of the cup (600) as shown in FIG. 2D) with an expected minimal force.

The machine (100) will also preferably be able to self-clean between servings and sanitize at regular intervals during the day. While the use of immersion blending reduces the amount of the machine in a food contact zone and that needs regular cleaning between servings, a number of considerations must be taken into account in order to ensure that the machine (100) is automatically fully cleaned before any customer can use it to prepare a new drink. This includes the removal of any potential allergens and any risk of pathogenic growth on any part of the food contact surface. This is especially relevant during times of pandemic or contagious disease spread.

Figure 7:
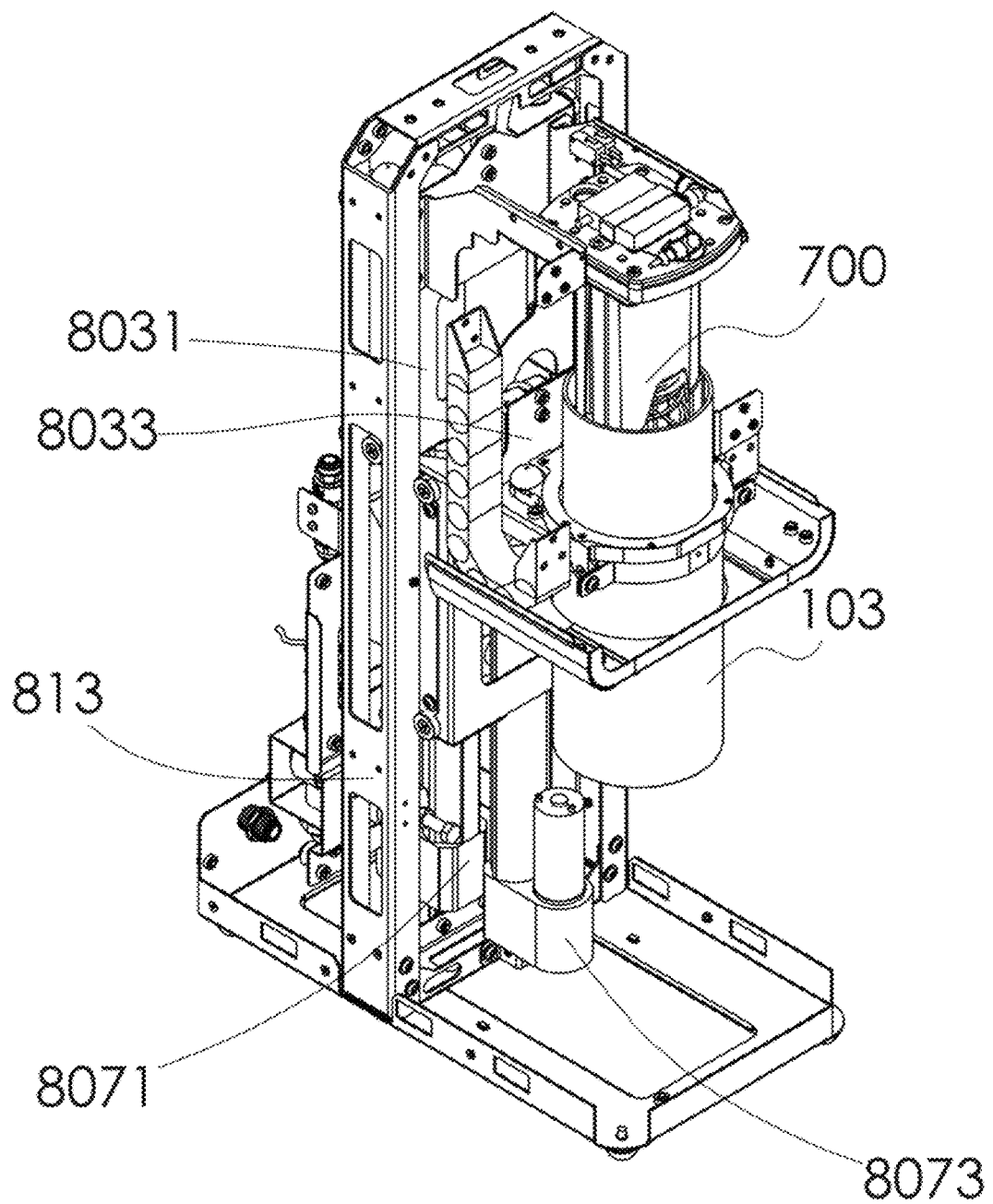
FIG. 7 shows a partial view illustrating an embodiment of a lifting mechanism for the blender assembly.

The primary functional components of the machine (100) are formed into the blender assembly (700) which performs most of the actions of the machine (100). An embodiment of a blender assembly (700) is shown in an exploded view in FIG. 8 and another as a partial assembly in FIGS. 3A and 3B. FIGS. 2A-2E are useful to see relative movement of components relative to each other and FIG. 7 shows how another blender assembly (700) is mounted within the machine (100).

The blender assemblies (700) in the depicted embodiments utilize two major elements (701) and (703). The first is the blending component (703) which comprises the blender shaft (731) with attached blade (775), the motor (733) for driving the blender shaft (731), and the motor enclosure (735) which holds the motor (733) and can provide for cooling of the motor (733). The blending component actually performs the blending and is generally in the form of a large and powerful immersion blender. As such, the blender blades (775) may comprise any form of blades, knives, paddles or other structure which can be configured to puree fruit and vegetable matter.

The second component is the positioning head (701) which typically comprises the cup hat (711) and the shaft enclosure (713). The positioning head (701) will typically be connected to the motor (733) and/or motor enclosure (735) by a coil spring (741) or other biasing member which serves to bias the positioning head (701) to a position where it extends over the terminal end (773) of the blender shaft (731). The positioning head (701) will also typically be able to slide along the blender shaft (731) but is biased by spring (741) into a position where the blender shaft is more fully withdrawn from the shaft enclosure (713) as shown in, for example, FIG. 3A. The positioning head (701) acts to position the blending component (703) relative to the cup (600) and thus allow the blending component (703) to blending safely, effectively, and consistently.

The cup hat (711), in the depicted embodiment is attached around the blender shaft (731) and the blender shaft (731) is capable of sliding through the cup hat (711). Typically, the sliding of the blender shaft (731) will involve a relatively high amount of contact with the cup hat (711) and will often have little or no clearance. This can allow the cup hat (711) to wipe material from the blender shaft (731) as the blender shaft (731) is moved.

The cup hat (711) is sized and shaped to mate with the smoothie cup from above in order to create a seal with the cup (600) that prevents splatter during the filling and blending operations and to contain all ingredients and areas that need to be cleaned between blending sequences. The cup hat (711) is also sized and shaped allow for the shaft (731) to move smoothly up and down while still containing all liquid within the cup (600). This allows the blender blade (775) which will be typically mounted at or toward the terminal end (773) of the shaft (731) to be raised and lowered independently from the positioning head (701) and to be positioned within the cup hat (711) when not in the cup (600). The cup hat (711) can also be sized and shaped to help direct water additions into the cup (600) in a controlled manner and to be easy to clean.

Such movement and positioning can be important as it allows for movement of the blade (775) within the cup (600) during the blending action. This can make it easier to access ingredients lower down in the cup (600) with the blade (775). The self-centering nature of the cup hat (711) relative to the cup (600) provides for the benefit of ensuring a good seal to inhibit fruit from being ejected from the rotating blades (775) and also to inhibit the blades (775) from damaging the cup (600) during blending. Specifically the centering provides that the blades (775) are arranged generally at the center of the cup's (600) cross-section and will usually be sized and shaped to be spaced from the cup's (600) walls even at the cup's (600) narrowest diameter point. The blander shaft (731) may also be sized so that it cannot interact with the base of the cup (600) even when fully descended into the cup (600) as shown in FIG. 2D.

Figure 4A:
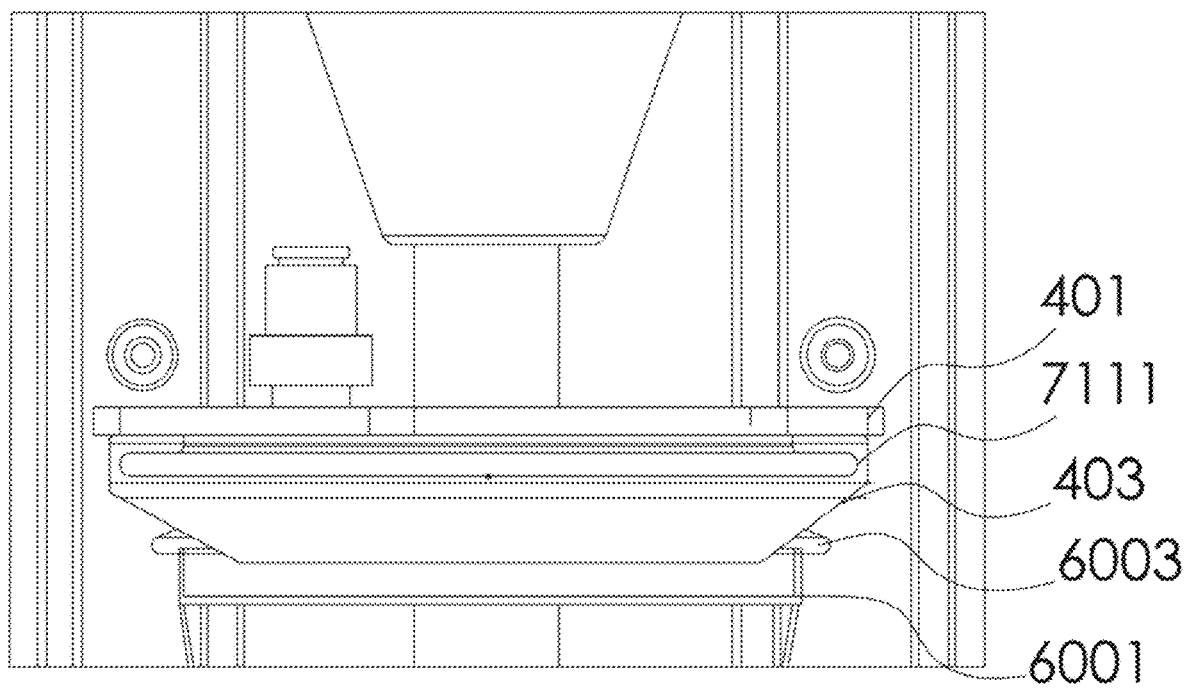
FIG. 4A depicts a cut through of an embodiment of a cup hat engaging the lip of a cup from inside the internal volume.
Figure 4B:
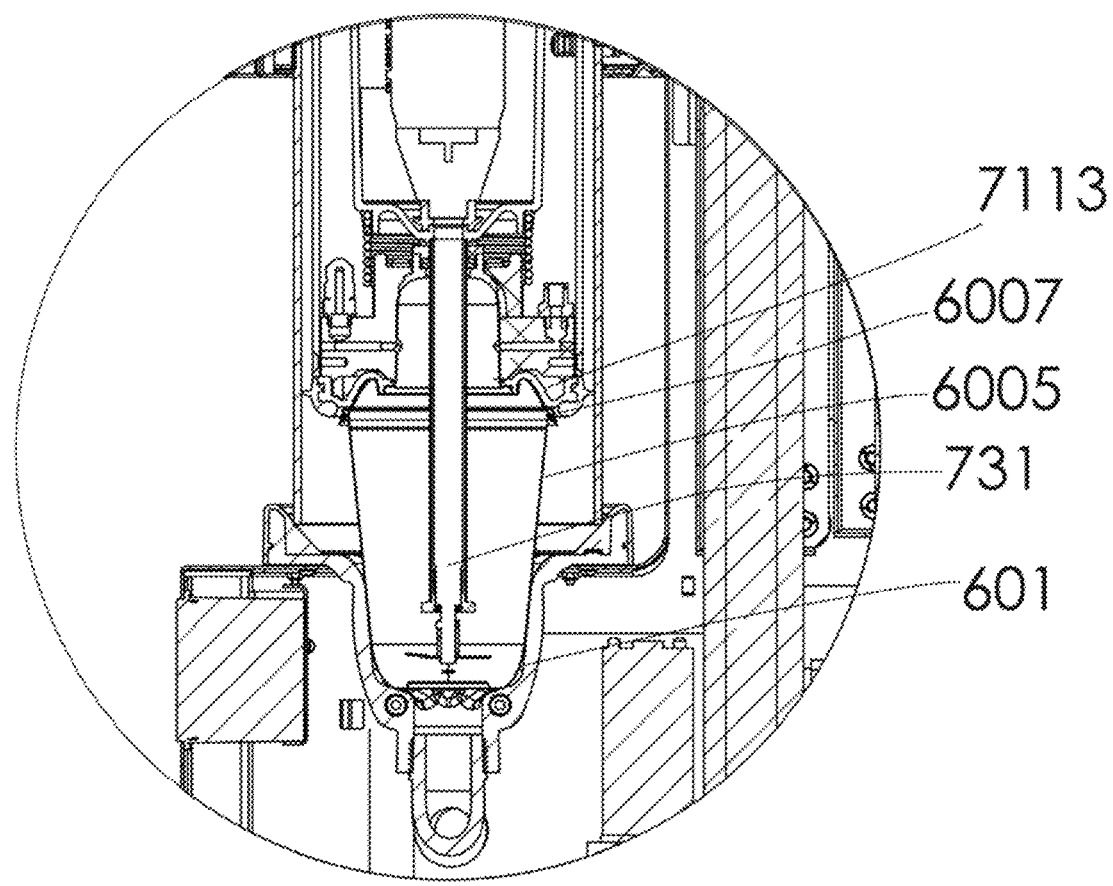
FIG. 4B depicts a cut through of an embodiment of a cup hat engaging a lid of a cup from outside the internal volume of the cup.

Depending on the type of cup (600) to be used, the cup hat (711) may be in the form of the embodiment shown in FIG. 4A or FIG. 4B. In FIG. 4A, The cup hat (7111) comprises a generally flat disk (401) with a tapered underside (403) generally in the shape of an inverted conical pyramid frustum. This cup hat (7111) is generally designed to interface with a cup (6001) with no lid present. As such, the cup hat (7111) when lowered onto the cup (6001) will typically contact the lip (6003) of the cup (6001) from the inside of the lip (6003). This creates a solid seal with the lip (6003) and also will serve to generally center the cup hat (7111) on the cup (6001) as they are both typically circular. The underside (403) may comprise a deformable surface such as, but not limited to, being constructed of rubber or silicone that can seal against the lip (6003) of the cup (6001). This surface may be stretched or over-molded over a hard interior and may be removable for easy cleaning or the entire underside (403) may be constructed of such material.

In the embodiment of FIG. 4B, the cup hat (7113) is designed to interface with a cup (6005) which has a partial or permeable lid (6007) attached thereto or which has a raised lip or curves back in toward its internal volume. These arrangements can make it difficult to solidly contact the cup (6005) toward the top from inside the lip. In this embodiment, the cup hat (7113) is sized and shaped to interface with the lid (6007) or the upper surfaces of the cup (600) from outside the internal volume and, thus, in the depicted embodiment, has a more concave shape than the cup hat (7111) which is generally convex. This enables the cup hat (7113) to better interface with the cup directly from above (e.g. contacting an upper or top surface) as opposed to cup hat (7111) which typically interfaces with the lip (6003) primarily from the inside of the lip (6003). In an alternative embodiment, the cup hat (7111) of FIG. 4B may also include a component to interface with the lip (6003) of the cup (6005) should the lid (6007) be removed. The cup hat (7113) may be constructed of similar deformable materials and in similar fashion to the cup hat (7111) to provide a solid seal.

In an embodiment, the cup hat (711) may also include a wiper (717) which extends beyond the shaft enclosure (713). The wiper (717) will typically be constructed of the same material as the deformable surface of the cup hat (711) and may be formed as a monolithic piece thereof. However, such formations are by no means required and the wiper (717) may be formed as a separate piece using any kinds of material suitable to "wipe" materials from the surface of the safety door (103). The wiper (717) is sized and shaped to rub against the interior of the safety door (103) when the positioning head (701) moves relative to the safety door (103) to wipe off the inside of the safety door (103). Regardless of the specific design, the cup hat (711) will also typically be rigidly attached to the base (715) of the shaft enclosure (713). Thus, the positioning head (701) will usually move as a single component relative to the elements of the blending component (703) which slide therethrough.

The cup hat (711) will also typically include a pressure release. Pressure can build up in the cup (600) due to the force of the blender and addition of water to the cup (600) after the cup hat (711) has been sealed to the cup (600). Air is able to escape from the cup (600) (303) through a release mechanism (719) in the cup hat (711). As the release mechanism (719) is above the cup (600), liquid can typically not pass through the release mechanism (719) so long as the liquid level remains below cup hat (711). However, a gas permeable membrane or other system may be included to inhibit liquid from passing through the release mechanism (719) while still allowing the release of gas. The release mechanism (719) may comprise any form of air release device valve known to those of ordinary skill in the art and will typically comprise a one-way valve along with any separators, filters, or other components that may be desired. In an embodiment, the release mechanism (719) may comprise a simple hole or snorkel. A silencer may be attached to the release mechanism (719) to quiet the air release. The cup hat (711) is typically sealed to the cup (600) via the pressure of the spring (741) pushing it onto the lip (6003) or lid (6007) as discussed in greater detail later.

In an alternative embodiment, air venting may be performed by placing the cup hat (711) a very small distance from the cup (600) so that there is not a good seal between the cup hat (711) and the cup (600). Water or other liquid may then be added to the cup (600). Due to the proximity of the cup hat (711) to the cup (600), any splash from the cup (600) will generally impact the cup hat (711) and either be held in place by surface tension, or drip into the cup (600) due to the proximity of the cup hat (711) above the cup (600). After the water has been supplied to the cup (600), the cup hat (711) may be further lowered to contact the cup (600) or may remain in place if that is sufficient for future blending and air venting remains necessary during blending. In a still further alternative embodiment, air venting may be eliminated as unnecessary.

Figure 3A:
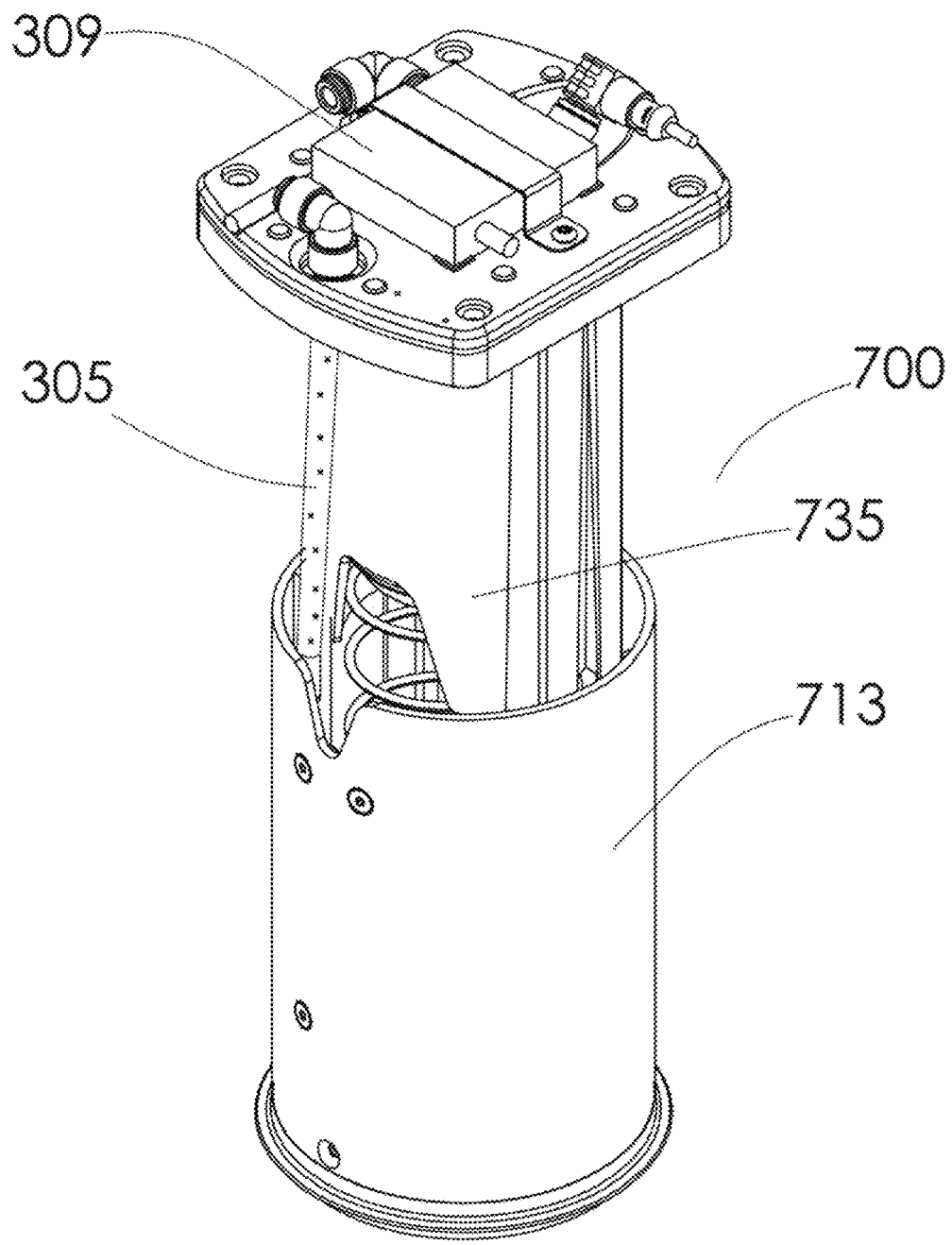
FIG. 3A depicts an embodiment of a motor enclosure utilizing fill water for use in resultant drinks and/or cleaning to cool the motor.

The machine's plumbing system is best shown in FIG. 3A and is designed to provide water or other liquid to two different places. The first is the smoothie filling nozzle (303)

located in the cup hat (711) which is used to provide water into the cup (600) to be used as part of the drink. The second location is to provide cleaning water to the basin (601). Depending on the embodiment, the filling nozzle (711) may be used to provide water to the basin (601) when the machine is in its cleaning arrangement (e.g. FIG. 2E) or a separate nozzle or set of nozzles may alternatively be provided. This later arrangement may also be used when a cleaning or sanitizing agent is to be added to the water during cleaning.

It is also the case that suction can be created between the cup hat (711) and the cup (600) at the end of a blending cycle or, and often more importantly, the viscous nature of the drink can provide a high friction connection with the blender blade (775) as the blade (775) is being withdrawn due to the blender shaft (731) retracting. If unchecked, these connections can result in the cup (600) being lifted by the blender assembly (700) as it raised at the end of the blending sequence. In an embodiment, friction can be broken by injecting a small amount of liquid through the nozzle (303) of the cup hat (711) to increase the pressure in the cup (600) and break the vacuum seal at the end. The nozzle (303) preferably contains a check valve to prevent any air or drink material traveling backward into the nozzle (303) and liquid line (305) during the blending sequence. The jet will usually be designed to direct a precise controlled amount of liquid into the cup (600).

Figure 3B:
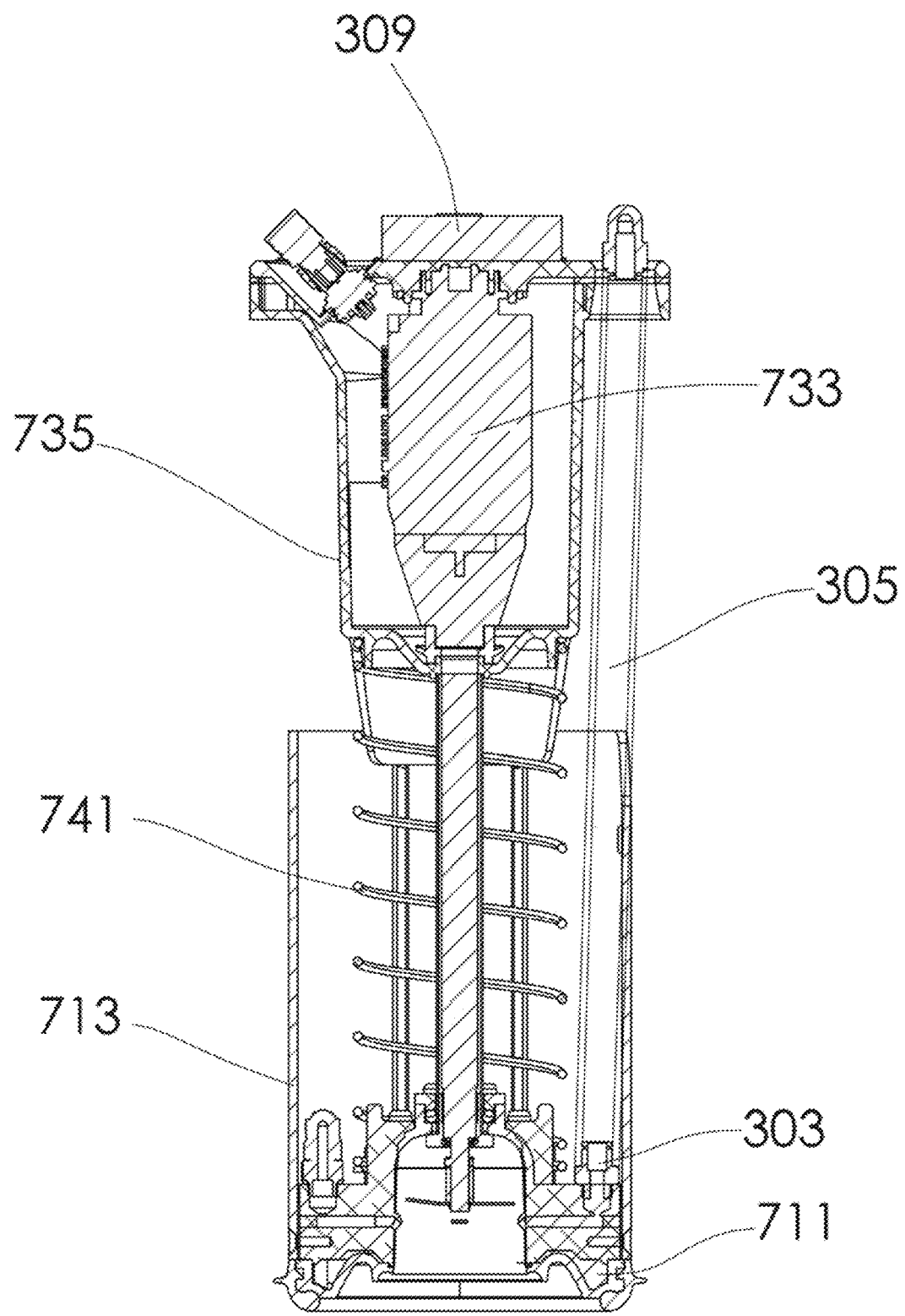

As can be seen in FIG. 3B, water used to fill the cup (600), or otherwise to pass through the nozzle (303), can also be used to cool off the blender motor (733) between uses through a heat sink or heat exchanger (309). Specifically, after addition of water to the cup (600), if the water is not allowed to flow through the nozzle (303), the water in contact with the heat exchanger (309) will trap heat from the exchanger (309) but not impart that heat to the drink. As heat is the main cause of wear on the blender motor (733), this element can increase the operational lifespan of the blender motor (733). Further, routing the water past the exchanger (309) can also result in warming of the water from the heat from the blending motor (733) which will often run quite hard during the blending action. This water, if used for cleaning operations, can then be at a higher temperature than the generally default cold water used for adding water to drinks.

Figure 8:
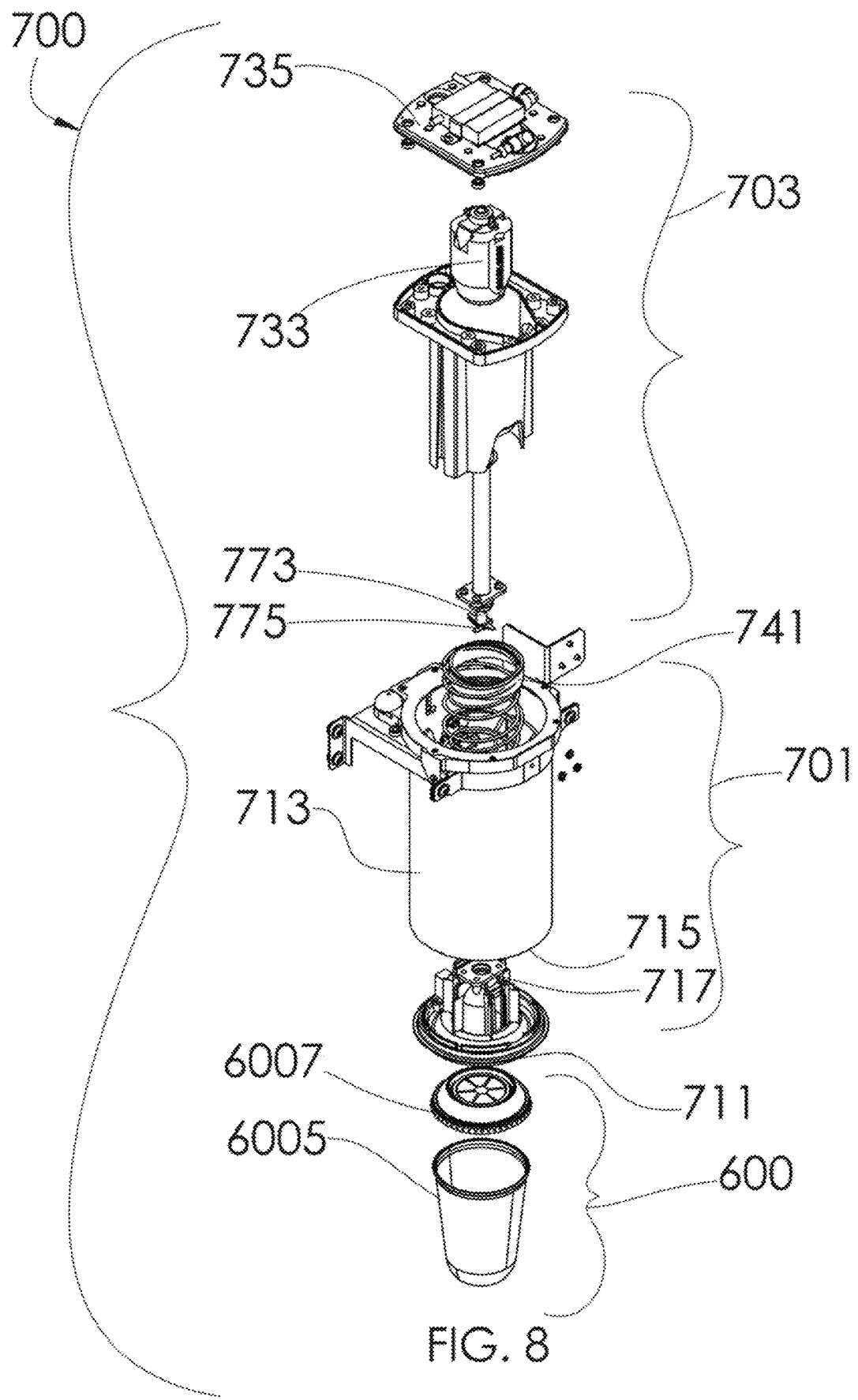
FIG. 8 shows an exploded view of an embodiment of a blender assembly

While water addition after the blending is complete as discussed above can provide for one way to release vacuum in the cup, in the depicted version of FIG. 8, a spring (741) or other biasing member can actually serve this purpose. Specifically, when the blender shaft (731) is retracing through the cup hat (711), the spring (741) will typically be compressed pushing the cup hat (711) into contact with the cup (600). Use of water to release the cup hat (711) from the drink and cup (600) can create an undesirable layer of water on top of the drink which may be unappetizing. Use of the spring (741) avoids this while also dealing with the pressure issue and inhibiting the cup (600) from being lifted and/or dropped as the blender shaft (731) withdraws.

Figure 5:
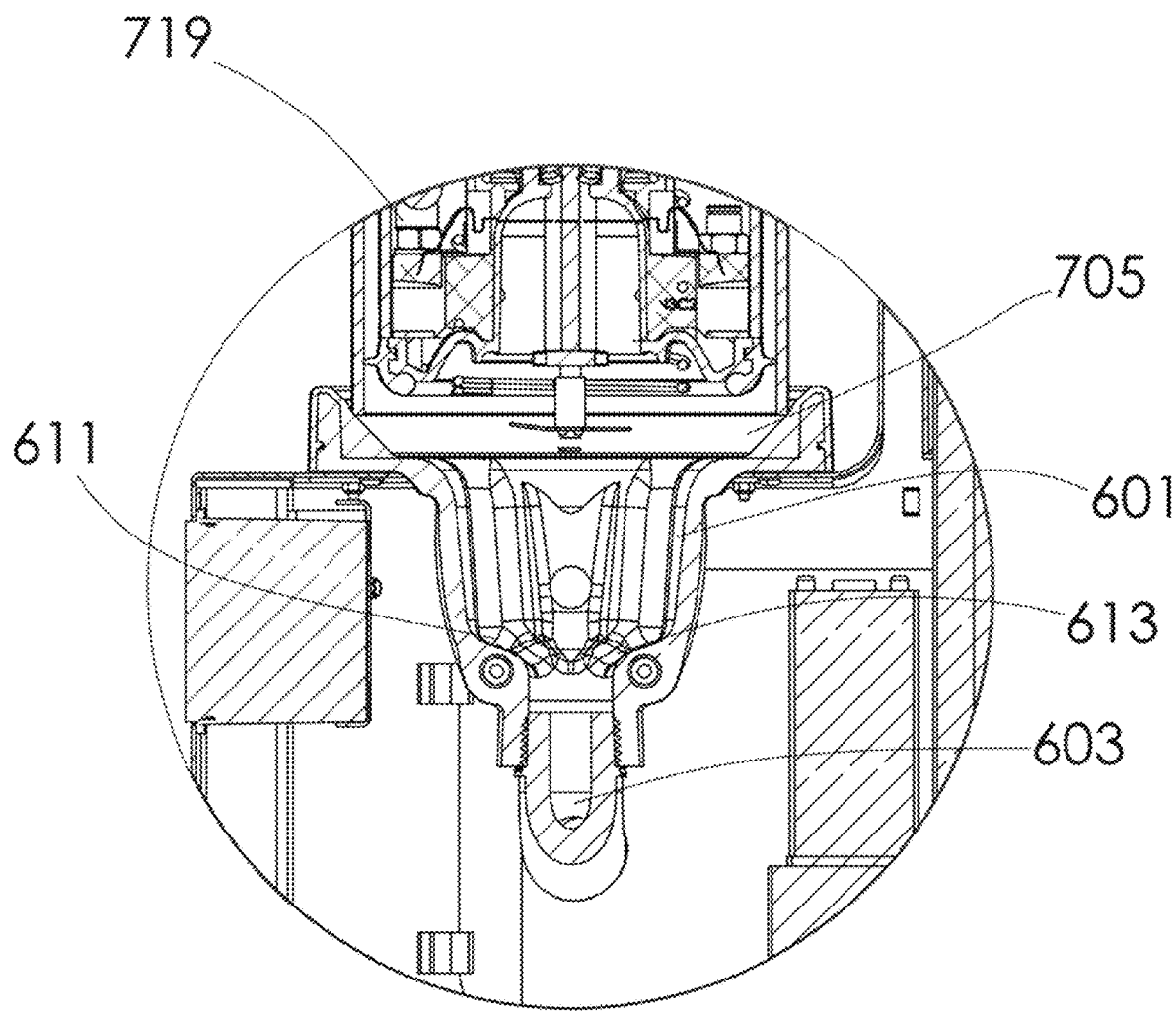
FIG. 5 depicts an embodiment of cut through of a cleaning basin with the cup hat of FIG. 4A.

As discussed previously in conjunction with FIG. 6, in an embodiment, the cup (600) sits in a basin (601) where its presence can be detected. The basin (601) can serve to help the user to position the cup (600) so that it is generally centered with the cup hat (711) providing only the final necessary adjustment to centering. The basin (601) can also serve to provide friction to the cup (600) which can be used to inhibit its lifting by the retraction of the blender shaft (731) and its rotation during the blending action. The basin (601), however, in the depicted embodiment of FIG. 5 provides for additional functionality.

In particular, basin (601) can act as a cleaning vessel to contain any ingredients that may drip off after the blending sequence and the blender shaft (731) is raised and the cup (600) has been removed. It should be apparent that due to the viscous nature of many smoothie drinks, there will likely be food matter stuck to the lower part of the blender shaft (731) and the blender blades (775) after blending and before cleaning. Once the cup (600) is removed, these can drip off the shaft (731) and blades (775) to where the cup (600) was. In FIG. 5, this will cause them to drip into the basin (601). The basin (601) of FIG. 5 thus includes a drain (603) from the lowest point of its base (611). The basin (601) may also include liquid nozzles attached to water pipe (305). These can be used to clean off the blender shaft (731) and blades (775), cup hat (711), the basin (601) itself and any other surfaces or objects which may be splattered by food before, during or after the blending sequence during a cleaning sequence as discussed later.

As can be seen in FIGS. 2A-2E the blender shaft (731) moving relative to the cup hat (711) is not the only movement performed by the machine (100). In order to provide space to insert the cup (600) as well as to completely clear the blending shaft (731) and blades (775) from the area where the user's hands will be when taking the cup (600), the entire blender assembly (700) may move.

An embodiment of the movement of the blender assembly (700) is shown in FIG. 7. In this embodiment, a plate and track lifting system comprising multiple carriages (8031) and (8033) each of which is driven by an associated motorized linear actuator (8071) and (8073). The blender carriage (8031) supports the blender assembly (700) and is used to raise and lower the blending assembly (700) under action supplied by the blender actuator (8071). The door carriage (8033) supports the safety door (103) and is used to raise and lower the door 9103) under action of the door actuator (8073). This arrangement allows for the safety door (103) and blender assembly (700) to be moved completely independently.

Each of the carriages (8031) and (8033) in the depicted embodiment is provided with wheels or bearings which allow the carriage (8031) or (8033) to ride on the opposing sides of a track unit (813) which provides tracks on the opposing surfaces. The tracks are intended to provide for limited range of motion for both the door (103) and blender assembly (700), in this embodiment so that they move generally linearly up and down relative to the cup holder (101). To reduce the risk of binding (or sticking), wear stripping made of self-lubricating plastic may be added the track unit (813) along the path of the wheels of the carriages (8031) and (8033). In an alternative embodiment, roller bearings perpendicular to the wheels and against the tracks (813) can also be used.

While the above arrangement provides for good support, in alternative embodiments motion of the safety door (103) and blender assembly (700) may be linked so that the machine (100) requires only a single motor or actuator to move both items. Further, the linkage does not need to require them to move in fixed relationship at all times, but can utilize gearing, power-take-off, transmissions, or other similar mechanisms to provide either a pattern of movement or independent movement between the door (103) and blender assembly (700).

Further, alternative drive mechanisms and carriage components may be used including, but not limited to, linear track bearings, machined cylinders coupled with bushings, as well as sliding roller bearings. Alternative embodiments of the drive system may include using a motor (DC brushed, brushless, stepper or servo) driving a lead screw, belt, or chain drive system to move the blender assembly (700) and/or door (103) up and down. Such alternative embodiments can yield a reduced footprint allowing a size reduction of the entire machine as one linear actuator or motor may be able to drive both the blender assembly (700) and door (103). This may be independently through a two-stage stroke in which the motion of the blender assembly (700) and door (103) is counteracted by springs in opposite directions. In other words a single actuator only actively pulls the blender assembly (700) down while a spring pulls the blender assembly (700) up and visa versa for the door (103). This configuration could also be altered with the spring pulling the door (103) and positioning head (701) in the opposite directions.

In order to reliably control speed and force as well as tracking the position of the blender assembly (700) and door (103) in order to optimize the blending sequence and ensure safety, either or both the actuators may include a potentiometer (or encoder/hall sensors) that is used to detect its positions. An alternative embodiment may use a brushed direct current (DC) motor to provide accurate linear correlation of voltage to torque along with good initial torque. In order to control the speed and force of the linear actuator (807), a motor control shield may be included in the electronic system which uses pulse width modulation (PWM) to control the voltage of the DC motor moving the blender assembly (700). The combination of positional feedback and control of force also can be used by the machine (100) to detect pressure. This feature may be employed both by the blending sequence as well as detecting the presence of a lid still being on the cup (600) as contemplated previously.

In order to detect the position of both the door (103) and blender assembly (700) additional or alternative sensors to those contemplated above may be included to report to the controller the location of the door (103), blender assembly (700), blender carriage (8031), door carriage (8033), blender actuator (8071), or door actuator (8073). The sensors may be of any form such as, but not limited to, encoders, hall sensors, and/or potentiometers. Alternatively, pure software functions may be provided that detect or predict the location of any of these elements based on other feedback from the machine (100)

Without being bound to a particular order of operation, the machine (100) will typically operate as follows and as illustrated by the montage of FIGS. 2A through 2E. A user will first obtain a cup (600) with ingredients. This may be obtained through a separate vending machine, out of a freezer, or through any other source. The user will typically remove any lid or lid protector (depending on embodiment) and press "start" on the software menu on display (801) to begin the processing and operation of the machine (100). Alternatively, the machine (100) may be activated by any other process such as by scanning the cup (600) on a barcode scanner on the machine or through a payment portal. These options can eliminate the need to touch any part of the machine (100) which may improve cleanliness and prevent the spread of disease. It also can allow the controller to upload expected cup (600) contents to inform the user of specifics of their selected drink, to track inventory of cups, and to select initial operating parameters for the blending operation. It can also be used to inhibit users from using counterfeit cups or reused cups in the machine (100).

Once the machine (100) is activated, the safety door (103) opens and the display (801) prompts the user to place the cup (600) in the cup support (101) which is basin (601) in this embodiment. Once a cup (600) is detected by sensor (603), the display (801) prompts a user to indicate specifics of their desired drink. This can include a thickness or similar indication and can also be used to indicate if any additional materials have been added to the cup (600). Payment may also be collected at this time. At this time, the machine (100) is in the configuration shown in FIG. 2A. Specifically, the cup (600) is present, the door (103) is open and the blending assembly (700) is raised.

Once a selection of drink specifics is made, the display (801) will typically alert the user that the safety door (103) is closing and begin to automatically close the door (103). Once the door (103) is detected as fully closed, the machine (100) is in the configuration of FIG. 2B. At this stage, the machine (100) may perform checks to make sure that it is safe to begin blending operations. Specifically, the machine (100) will typically verify that the cup (600) is still properly inserted and that there is no lid, lid seal, or other object present which could present a problem to the blending assembly (700). If all is in order, the blending assembly (700) will descend to place the machine in the configuration of FIG. 2C.

Figure 2C:
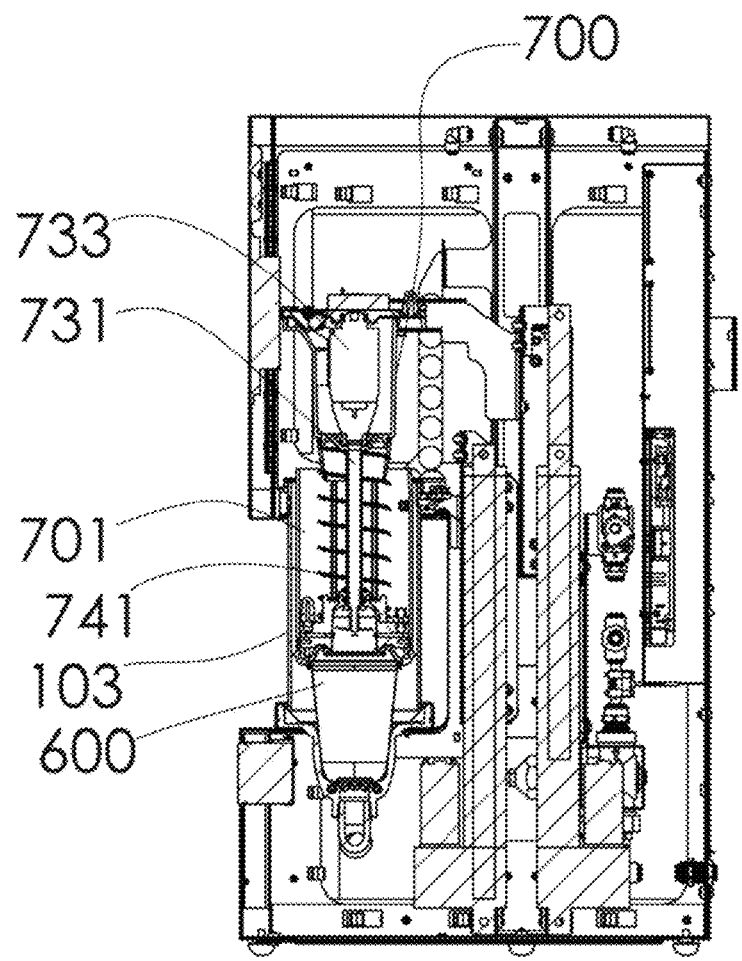
Figure 2D:
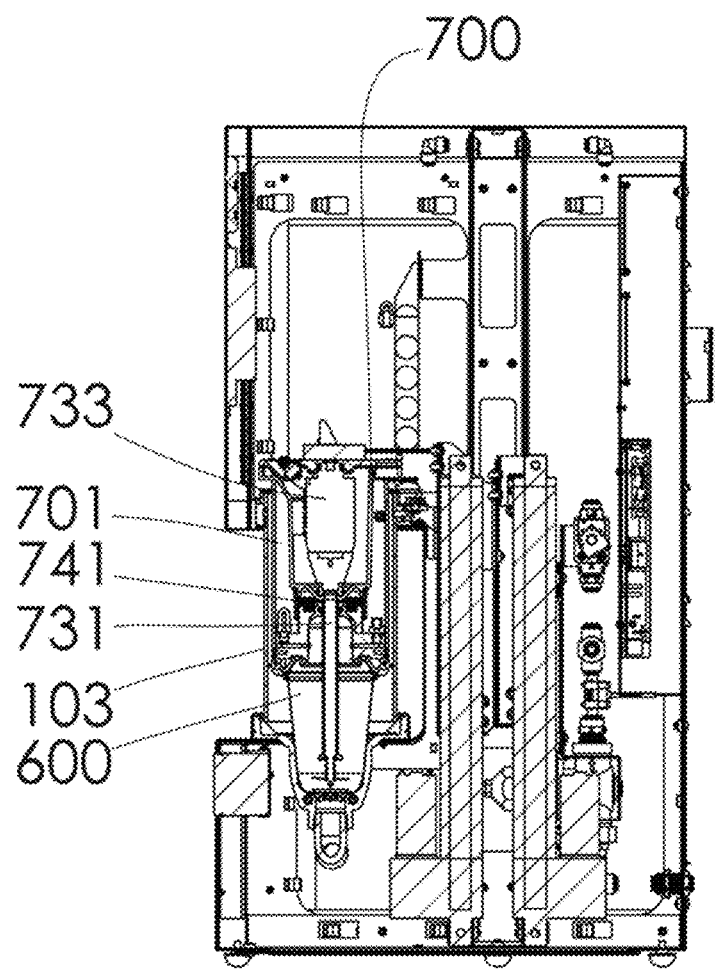
Figure 2E:
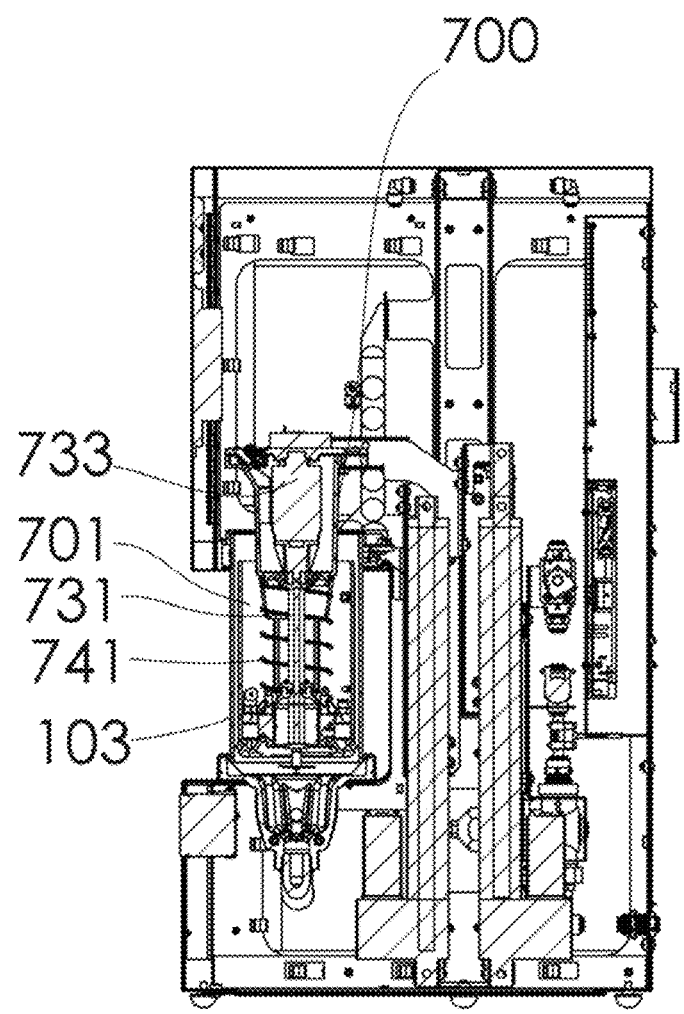

As should be apparent in FIG. 2C, the blending assembly (700) will typically descend as a whole unit until the cup hat (711) is in contact with the cup (600). As discussed previously, checks for a cup lid or lid protector may be performed at this time. The cup hat (711) will typically be the first part of the blending assembly (700) to engage the cup (600) and will serve to center the cup (600) and position the blending shaft (731) above the center of the cup (600). Not that liquid may be provided prior to the cup hat (711) engaging the top of the cup (600) in an embodiment.

Once in the configuration of FIG. 2C, operation will typically depend on specifics of the drink to be blended. The blender shaft (731) may first descend into the cup (600), liquid may first be added to the cup (600), both actions may be performed at similar time, or liquid may have been previously added as contemplated above. As should be apparent, when the blender assembly (700) has fully descended, the machine (100) is in the configuration of FIG. 2D. It is important to note that the blending shaft (731) was not descended by a separate actuator compared to the descent of the entire blending assembly (700). Instead, the cup (600) has acted as a barrier interfacing with the cup hat (711) but not the blender shaft (731) which can freely slide through the cup hat (711). Therefore, the cup hat (711) is held in place while the blending motor (733) and blending shaft (731) with attached blades (775) continues to descend placing at least a portion of the blending shaft (731) in the interior volume of the cup (600). This continued descent also compresses the spring (741) further increasing the tension between the cup hat (711) and cup (600) while simultaneously not increasing the pressure above the support strength of the cup (600) itself as the pressure is limited by the spring (741).

Typically, once the blender assembly (700) has fully descended placing the blender blade (775) toward the base of the interior volume of the cup (600), a final safety check may be performed. This may specifically make sure that the door (103) remains fully closed and detected by all sensors. After this, the blending action may be started automatically, or a user may be prompted via display (801) to activate the blending. Once activated, the machine (100) will fill the smoothie with a specific quantity of liquid (if not already performed) and the motor (733) will engage the blending shaft (731) rotating the attached blades (775) inside the cup (600). As blending progresses, the controller will monitor specifics of the operation of the blending shaft (731) and blades (775) and the blending assembly (700) may be moved up and down (between the arrangements of FIGS. 2C and 2D but generally not above the positon of FIG. 2C) to alter the part of the interior volume of the cup (600) that the blade (775) is interacting with. It should be recognized that so long as the terminal end (773) of the blending shaft (731) is in the cup (600) (e.g. lower than FIG. 2C), the cup hat (711) will generally be held to the top of the cup (600) by the spring (741).

The blending process will continue until the controller has determined that the drink is complete. Once the blending sequence is complete, the controller will typically inform the user via the display (801) that the drink is complete and the motion from FIG. 2A to FIG. 2D discussed above will be reversed. Specifically, the blender assembly (700) will withdraw upward. This will first cause the blending shaft (731) to slide back through the cup hat (711) with the cup hat (711) pushing any material from the drink down the shaft and ideally off the end and back into the cup (600). This retraction will continue until the configuration of FIG. 2C is achieved.

At this point, the blender shaft (731) has withdrawn as far as it is able relative to the cup hat (711). As the motor (733) continues to withdraw the blender assembly (700), the positioning head (701) will begin to withdraw upward. As the blender shaft (731) and attached blade (775) has cleared the cup (600) (or at least the contents of the cup (600)) at this time, there should no longer be any substantial force of the cup (600) attempting to raise it. Thus, the cup hat (711) should easily disengage the cup (600) and the blender assembly (700) will retract to the position shown in FIG., 2B. Finally, once the blender assembly (700) has fully retracted, the safety door (103) will open placing the machine (100) back in the configuration of FIG. 2A. The display (801) will then typically prompt the user to grab his or her drink and depart the machine (100).

Once the cup (600) is removed by the user, the machine (100) will typically lower the safety door (103) after a specific time interval, sensor reading (e.g. by the sensor (603)) or user prompt. Once the safety door (103) has closed, and is detected in the locked closed position with no cup present in the basin (601), the cleaning sequence can begin.

In order to clean the machine, the blender assembly (700) lowers as contemplated in conjunction with FIGS. 2B-2D. However, as there is no cup present in the basin (601), the cup hat (711) will not contact a cup (600). Instead, the positioning head (701) will typically lower all the way to the position shown in FIG. 2E. In this position, the cup hat (711) is in contact with the upper rim (605) of the basin (601). The blender shaft (731) typically is lowered to place the blades (775) which are usually located on or near the terminal end (773) within the bowl of the basin (601). As the cup hat (711) is also sized and shaped to form a seal with the upper rim (605) of the basin (601) in the same way that it connects with the cup (600), this forms an enclosed chamber including the basin (601).

Once in place, cleaning liquid or water is supplied to the basin (601). This may be via the nozzle (303) or via an alternative dedicated water valve/pump in the basin (601). Regardless of source, the liquid is used to spray the blender blades (775) and/or to supply liquid to the basin (601) to form a pool (e.g. if the drain (603) is currently closed). The blender blades (775) may be agitated within the water spray and/or pool to remove any food particles from the blender blades (775), blender shaft (731), or surfaces within the enclosed area of the basin (601) and cup hat (711). Jets may also be operated within the pool to add further agitation.

The positioning head (701) may also be moved slightly upward during this water spray or during blender blade (775) agitation of the pool to remove any potential spilled smoothie on the safety door (103) or outside of the basin (601) by spraying those areas with liquid. Once the cleaning process is deemed complete, any residual liquid in the basin (601) may be flushed down the drain (603) and the machine (100) will return from the position of FIG. 2E to that of 2A or 2B to await the next user. In an embodiment, water may be supplied onto the inside of the door (103) and other internal components via a spray as the blender assembly is rising from FIG. 2E to FIG. 2B, the blender assembly (700) could then return to the position of FIG. 2E and back to 2B again without any further water actions to use the wipers (717) to clean the inside of the door (103)

While typically not performed after every drink blending action, the machine (100) may also further clean or sanitize itself at regular intervals using a combination of dispensing solid or liquid disinfectants/sanitizing agents into cleaning water or illuminating all food contact surfaces with a UV light to ensure there is no chance of pathogenic growth in any of the food contact surfaces. These may be supplied to the basin (601) or other components via dedicated nozzles or other supply systems depending on the chosen sanitization technique. In an embodiment, a pump, such as a peristaltic pump, may be used to supply the agent into the water line (305) or another water line to allow it to be supplied into the basin (601) along with cleaning water.

The basin (601) ideally will drain quickly to remove all particles from the cleaning liquid and ensure all surfaces are left unsoiled and that the water carries particles out with it. The rate of drainage through drain (603) can be controlled to some degree by the behavior of the blender blades (775) during the cleaning process. Specifically, when the blades (775) are spinning near the mouth (613) of the drain (603), it will usually inhibit water from escaping via the drain (603) by creating a vortex and throwing water against the walls of the basin (601) which must slide down. It should be apparent that sufficient amounts of water provided to contact surfaces will generally result in sufficient food particle removal for the machine (100) to be safely cleaned. Further, the various wipers (the flexible connections between the cup hat (711) and blender shaft (731) and the cup hat (711) and the safety door (103) discussed above) can be used to wipe down surfaces and inhibit the formation of water spots.

It is generally preferred that the machine (100) automatically clean itself after every drink is prepared and can perform further cleaning cycles and additional sanitization cycles based on the frequency of use and/or a set period of time. The sanitization sequence will typically be a secondary and less frequent procedure that automatically kills any potential pathogen that denatures many potential contaminants. It also will ensure there is no bacterial or mold build up in the drain system and ensure an extended sanitary operation even with the machine (100) being left unattended.

An embodiment of sanitization uses an external reservoir of prepared sanitizing solution that can be added to cleaning nozzles in the basin (601) via a venturi valve and controlled by a solenoid valve. This is used to inject precise quantities of sanitizing fluid into the system and with proper dilution with fresh water. The combination sanitizing fluid and water may be ejected through cleaning nozzles at the base of the cleaning basin (601) and directed up towards the food contact area to contact and soak all surfaces which may have come into contact with drink particles. In addition to or alternatively to the use of sanitizing fluid, hot water or steam may be used as part of the sanitizing process. Ultraviolet (UV) lights may also be included to act as a further anti-microbial treatment. After the cleaning cycle is complete (and any sanitizing cycle when it is performed), the display (801) will return to the "start" screen ready for another user to use the machine (100).

Other features of the machine may be provided in alternative embodiments. For example, the controller in the machine (100) may interface via a network with a user's mobile device "app" which may provide the ability to remotely operate the machine (100), pay for products, or otherwise interface with the machine (100). Additional content may also be provided via the app or via the display (801) such as, but not limited to, instructional videos, nutritional info of smoothie recipes, and advertisements and/or promotions.

There may also be an option to integrate a payment interface with the controller that will initiate several payment steps should the machine be in a location where the user pays for his or her drink with no cashier or attendant in the vicinity. Software may also be included in the controller to make the machine (100) a connected device to a central computer via a network in order to track performance and/or sales data, to allow for remote software upgrades, and/or allow the user to manage systems remotely.

Information on the operation of the machine (100) may be used to, for example, track user activity and performance of the machine (100) and provide insight on client information such as frequency of visits and preferred drink flavors. This can also be used to improve design and operations via feedback and measure results through data collected. Other useful data can be monitoring of inventory levels of cups (600) to optimize supply routes and operations. The controller can also provide remote diagnosis of the machine (100) to identify any components at risk or failing or that have already failed. This will be useful in the servicing of the machine (100) and also reduce downtime.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "parallel" are purely geometric constructs and no real-world component or relationship is truly "parallel" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A machine for automated drink blending, the machine comprising:
   a cup including a lid;
   a cup support holding said cup;
   a blender assembly including:
      a blender shaft with blender blades attached thereto;
      a motor for rotating said blender shaft;
      a cup hat, said cup hat being sized and shaped to engage said lid from outside an internal volume and hold a top of said cup while said blender shaft descends through said cup hat to place said blender blades into said internal volume of said cup; and
      a nozzle in said cup hat for supplying liquid to said internal volume of said cup through said cup hat and said cup lid; and
   a lift mechanism for raising and lowering said blender assembly relative to said cup support;
   wherein said motor rotates said blender shaft while said blender blades are within said internal volume of said cup.

2. The machine of claim 1, further comprising a safety door which can alternatively allow and deny access to said cup support.

3. The machine of claim 1, wherein said internal volume of said cup includes chunks of material and said motor rotating causes said blender blades to puree said chunks within said internal volume of said cup.

4. The machine of claim 3, wherein said chunks are selected from the group consisting of: chunks of fruits, chunks of vegetables, and combinations of the two.

5. The machine of claim 3, wherein said liquid is supplied to said internal volume of said cup before said motor rotating is initiated.

6. The machine of claim 3, wherein said liquid is supplied to said internal volume of said cup before said cup hat engages said cup.

7. The machine of claim 3, wherein said liquid is supplied to said internal volume of said cup as said motor is rotating.

8. The machine of claim 1, further comprising a coil spring biasing said cup hat to engage said cup.

9. The machine of claim 1, wherein said cup support includes a basin configured to have said cup placed therein.

10. The machine of claim 1, wherein said cup hat includes an air release.

11. The machine of claim 1, further comprising a computer controller for automatically raising and lowering said lifting mechanism, activating said motor and rotating said blender shaft; and supplying liquid to said internal volume.

12. The machine of claim 11, wherein said computer controller can alter at least one of: a position of said blender blades relative to said cup or a speed of said motor, in response to sensor feedback indicative of resistance encountered by said blender shaft.

* * * * *